United States Patent Office 3,505,679
Patented Apr. 14, 1970

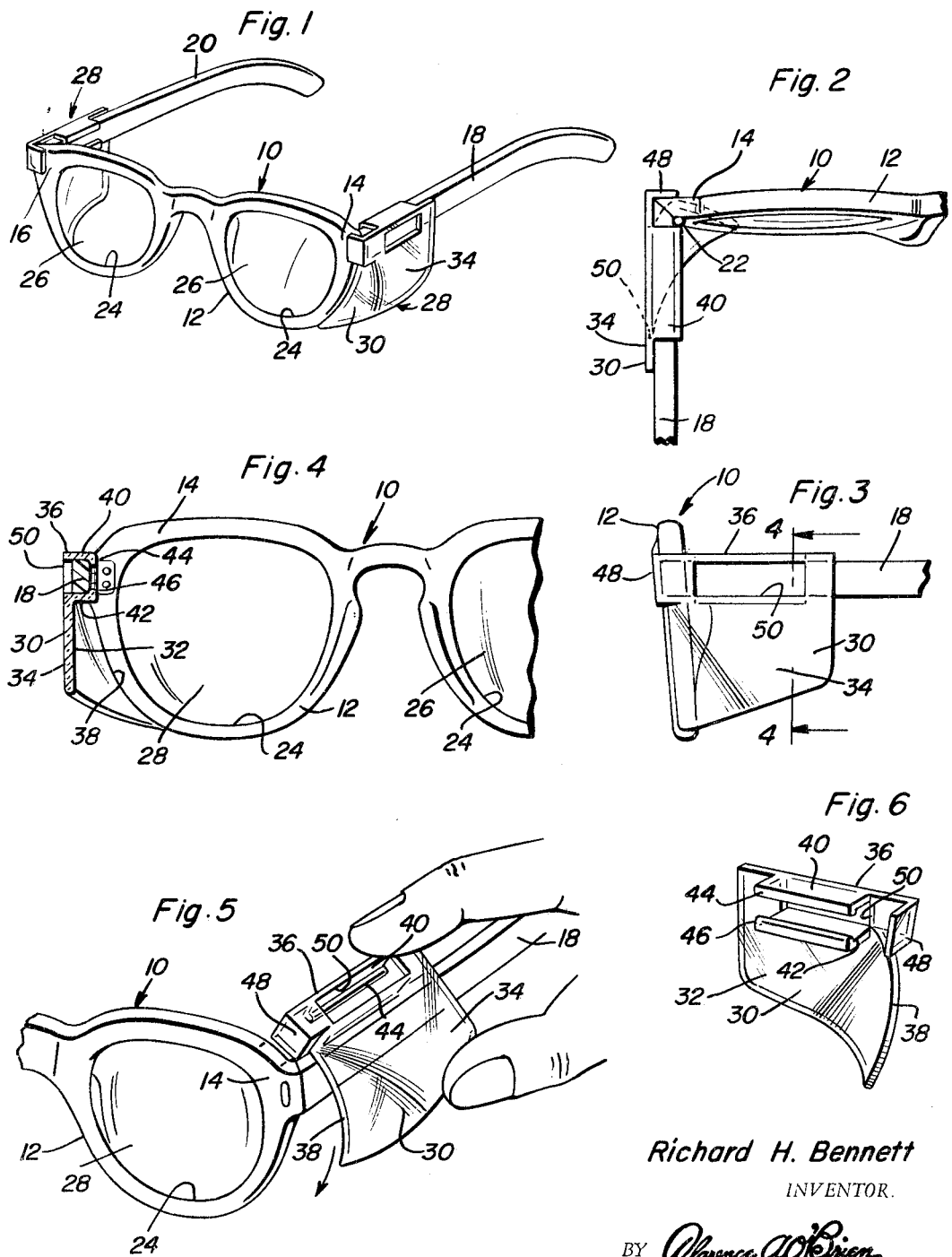

3,505,679
REMOVABLE EYE SIDE SHIELD FOR GOGGLE TEMPLES
Richard H. Bennett, 239 Broad St., Oneida, N.Y. 13421
Filed July 3, 1968, Ser. No. 742,466
Int. Cl. A61f 9/00
U.S. Cl. 2—13          6 Claims

ABSTRACT OF THE DISCLOSURE

A side shield for glasses of the type including a forward frame portion having upper opposite side corner portions to which the forward ends of a pair of temple bars are pivotally secured, the side shield including an upstanding panel-like member constructed of tarnsparent material provided for removable support from the forward end of each of the temple bars with the panel member depending downwardly from the corresponding temple bar and having its forward edge portion conforming to and disposed immediately adjacent the corresponding side edge portion of the frame portion of the glasses.

---

The side shield is provided for support from the forward end of a corresponding temple bar of a glasses or goggle frame and provides a means whereby a transparent shield is afforded at the corresponding side of the glasses or goggle frame to prevent the passage of foreign material into the eye of the wearer of the glasses or goggles.

In many instances persons having to wear glasses for correcting their eyesight live or work in environments in which there is danger of injury to one or both eyes by foreign particles entering the areas behind the lenses of the glasses from the side. While persons not requiring corrective lenses may find safety goggles readily usable, which safety goggles are for the most part provided with means for protecting against eye injury from the side, some safety goggles do not have such safety features formed therein and persons who must wear corrective lenses don't enter into the environments in which their eyes are subject to damage from the side frequently enough for them to have special corrective lenses incorporated into the construction of safety goggles. As a result, many persons who need corrective lenses and at least occasionally find themselves in environments in which their eyes are subject to damage from flying particles wear regular eyeglasses provided with impact resistant corrective lenses. Of course, conventional eyeglass construction does not afford protection from flying particles entering behind the frame of the eyeglasses from the side.

Accordingly, it is the main object of this invention to provide readily removable side shields for conventional eyeglasses which may be quickly applied to the eyeglasses whenever the wearer of the eyeglasses feels there is danger present from flying particles. In this manner, the shields may be applied when needed and quickly removed when not needed in order that the person's glasses may be conventional in appearance. Of course, such persons should be sure to have impact resistant lenses in their glasses.

Another object of this invention is to provide impact resistant side shields for glasses constructed of a material which is as nearly optically clear as optical glass and which is at least as impact resistant as tempered safety glass utilized in the production of impact resisting lenses for glasses.

Yet another object of this invention is to provide side shields in accordance with the preceding objects and which are contoured in a manner such that distortion of side vision of the wearer is maintained at a minimum.

Another important object of this invention is to provide side shields in accordance with the preceding objects which may be readily attached to and removed from associated eyeglasses in a manner such that when the shields are secured to the glasses they will be locked in position against shifting relative thereto.

A final object of this invention to be specifically enumerated herein is to provide side shields for glasses which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a conventional pair of eyeglasses provided with impact resistant lenses and having a pair of the side shields of the instant invention removably mounted on the temple bar portions of the glasses;

FIGURE 2 is an enlarged fragmentary top plan view of the left side of the glasses illustrated in FIGURE 1;

FIGURE 3 is a fragmentary enlarged side elevational view of the left side of the glasses illustrated in FIGURE 1;

FIGURE 4 is a fragmentary vertical sectional view taken substantially upon the plane indicated by the section line 4—4 of FIGURE 3;

FIGURE 5 is a fragmentary enlarged perspective view of the left forward corner portion of the glasses illustrated in FIGURE 1 with the corresponding shield being disposed in position for attachment to the left temple bar of the glasses; and FIGURE 6 is a perspective view of the left shield of the instant invention.

Referring now more specifically to the drawings, the numeral 10 generally designates a more or less conventional eyeglass frame assembly including a frame portion 12 having upper opposite side corner portions 14 and 16 to which the forward ends of a pair of temple bars 18 and 20 are pivotally secured by means of conventional hinge assemblies 22. The frame portion 12 defines a pair of apertures 24 in which conventional impact resistant lenses 26 are disposed.

The eye shield of the instant invention is generally referred to by the reference numeral 28 and is constructed in pairs with each shield of each pair comprising a mirror image of the other shield of the corresponding pair of shields. Accordingly, only the left hand eye shield 28 will be specifically described herein.

The eye shield 28 includes an upstanding panel-like member 30 including inner and outer sides 32 and 34, a generally horizontal upper marginal edge portion 36 and an upstanding forward edge portion 38. The upper marginal edge portion of the panel member 30 includes a pair of upper and lower horizontally inwardly projecting flanges 40 and 42 which terminate at their inner free ends in downturned and upturned vertical flange portions 44 and 46, respectively. The flanges 40 and 42 and the flange portions 44 and 46 coact with the panel member 30 to form a generally C-shaped inwardly opening channel in which the corresponding temple bar 18 is snugly receivable.

The panel member 30 projects forwardly of the forward ends of the flanges 40 and 42 and terminates in an upstanding inwardly directed abutment flange 48 whose purpose will be hereinafter more fully set forth. In addition, the area of the panel member 30 disposed between the flanges 40 and 42 has an opening 50 formed therein which at least substantially corresponds to the size and shape of the area of the panel member 30 between the flanges 40 and 42.

The shield 28 is of one-piece construction and is formed of a polycarbonate such as Lexan which is quite optically clear (as nearly so as optical glass) and which is more impact resistant than tempered safety glass. This material may be readily injection molded and accordingly, it may be seen that the shield 28 may be constructed by conventional production methods at a minimum of cost.

When it is desired to install the eye shield 28 on the temple bar 18, the eye shield 28 is held in the manner illustrated in FIGURE 5 of the drawings and lowered into contact with the inner upper marginal edge portion of the temple bar 18 behind which the flange portion 44 is engaged. Then, the eye shield 28 is pivoted in a clockwise direction as viewed in FIGURE 5 of the drawings so as to slightly spring apart the flanges 40 and 42 and to increase the distance between the free edge portions of the flange portions 44 and 46. As clockwise swinging of the eye shield 28 continues, the free edge portion of the flange portion 46 will slip beneath and across the undersurface of the temple bar 18 and snap behind the lower marginal edge portion of the inner longitudinal surface of the temple bar 18 to tightly clamp the eye shield 28 on the temple bar 18.

It may be noted from FIGURES 1–3 of the drawings that the eye shield 28 is snapped into engagement with the temple bar 18 in a manner such that the abutment flange 48 closely overlies the front surface of the corner portion 14 of the frame portion 12. This of course will prevent rearward shifting of the eye shield 28 along the temple bar 18. In addition, the forward end edges of the flanges 40 and 42 abut the hinge assembly 22 and prevent forward movement of the eye shield 28 along the temple bar 18. Therefore, once the eye shield 28 has been mounted on the temple bar 18, the eye shield 28 is retained in position thereon against movement relative thereto in all directions.

With attention now invited more specifically to FIGURES 1, 2 and 6 of the drawings it may be seen that the forward lower corner portion of the panel member 30 is partially cylindrical in configuration and that the axis of curvature of this portion of the panel member 30 is inclined forwardly and upwardly relative to the eyeglass frame assembly 10. Further, the radius of curvature of this partial cylindrical portion of the panel member 30 is such that the axis of curvature will pass generally through the associated eye of the wearer. Of course, the inner and outer sides 32 and 34 of the panel member 30 are parallel and accordingly, there is substantially no distortion in the view of the wearer through the partial cylindrical portion of the panel member 30.

Of course, when it is desired to remove the eye shield 28, it is manually grasped in a manner similar to that illustrated in FIGURE 5 of the drawings and rotated in a counterclockwise direction so as to substantially reverse the process of removably attaching the eye shield 28 to the temple bar 18.

The opening 50 serves to enable the flange portions 40 and 42 to flex further apart at their free ends in a manner such that approximately one half of the flexing occurs in the flanges 40 and 42 and the other half of the necessary flexure of the eye shield 28 in the portions of the panel member 30 adjacent the opening 50. By this construction, the eye shield 28 may be formed so as to have a tight clamping engagement with the temple bar 18 without necessitating excessive flexure of the eye shield in any given areas thereof during attachment of the eye shield 28 to the temple bar 18 or removal of the eye shield 28 from the temple bar 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In combination, a glasses frame structure including a forward elongated and transversely extending lens frame, a pair of elongated temple bars including front and rear ends, means pivotally supporting said front ends from opposite ends of said frame for oscillation of said bars relative to said frame about upstanding axes between extended positions with the rear ends of said bars projecting rearwardly of said frame and collapsed positions with said rear ends swung toward and past each other, a pair of side shields, each of said shields including an upstanding panel portion having inner and outer surfaces and overlying the outer surface of the forward end portion of the corresponding bar throughout substantially the entire extent of said panel portions along said bars, said panel portions each including upstanding front and rear marginal edge portions and an upper marginal edge portion, said inner surfaces adjacent said upper marginal edge portions including means defining generally horizontal inwardly opening channels extending along said shields and in which the corresponding temple bars are snugly retentively received, said front marginal edge portions including inwardly projecting flange portions which overlie the front face portions of the corresponding end portions of said frame from which said temple bars are pivotally supported for preventing rearward shifting of said shield along said temple bars.

2. The combination of claim 1 including a pair of lenses supported from opposite end portions of said lens frame, said frame including opposite end members which depend downwardly from the areas of said frame ends from which said temple bars are supported and which extend downwardly about the remote peripheral portions of said lenses, the front marginal edge portions of said panel portions including inwardly directed upstanding portions whose inner free edge portions closely oppose said downwardly depending opposite end members of said frame.

3. The combination of claim 2 wherein said front marginal edge portions curve inwardly toward said downwardly depending opposite end members of said frame along generally straight lines inclined rearwardly and downwardly.

4. The combination of claim 3 wherein said inwardly curving front marginal edge portions are generally partial cylindrical and the axes of curvature thereof are positioned so as to pass centrally through the eyes of the wearer of the glasses frame structure, said panel portions being constructed of transparent material.

5. The combination of claim 1 including a pair of lenses supported from opposite end portions of said lens frame, said frame including opposite end members which depend downwardly from the areas of said frame ends from which said temple bars are supported and which extend downwardly about the remote periperal portions of said lenses, the front marginal edge portions of said panel portions including inwardly directed upstanding portions whose inner free edge portions closely oppose said downwardly depending opposite end members of said frame, said panel portions further including upper forward inwardly projecting flange portions which overlie the front face portions of the corresponding end areas of said frame from which temple bars are pivotally supported for preventing rearward shifting of said shields along said temple bars.

6. In combination, a glasses frame structure including a forward elongated and transversely extending frame defining opposite end portions from which a pair of lenses are supported, a pair of elongated temple bars including front and rear ends, means pivotally supporting said front ends from remote upper portions of said frame portions for oscillation of said bars relative to said frame about upstanding axes between extended positions with the rear ends of said bars projecting rearwardly of said frame and collapsed positions with said rear ends swung toward and past each other, a pair of opposite side shields supported from said bars for oscillation therewith relative to said frame, said shields each including an upstanding panel portion depending below the corresponding temple bar and including a forward lower corner portion, said forward lower corner portions being generally partially cylindrical and curving inwardly toward their apices, the axes of curvature of said partial cylindrical portions being inclined forwardly and upwardly as well as forwardly and outwardly and being positioned so as to pass centrally through the eyes of the wearer of the glasses frame structure.

References Cited

UNITED STATES PATENTS

| | | | |
|---|---|---|---|
| 422,001 | 2/1890 | Wilson | 2—13 |
| 2,224,784 | 12/1940 | Goldschmid et al. | 2—13 |
| 2,253,101 | 8/1941 | Thoreson | 2—13 |
| 3,011,170 | 12/1961 | Lutz | 2—13 |
| 3,171,134 | 3/1965 | Kennedy | 2—13 |
| 3,384,903 | 5/1968 | Malcom. | |
| 3,423,151 | 1/1969 | White. | |

FOREIGN PATENTS 652,728　11/1937　Germany.

H. HAMPTON HUNTER, Primary Examiner